(12) United States Patent
Okamoto

(10) Patent No.: US 6,330,989 B1
(45) Date of Patent: Dec. 18, 2001

(54) CONDUIT GUIDE FOR BICYCLES

(75) Inventor: Yoshifumi Okamoto, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/291,969

(22) Filed: Apr. 15, 1999

(51) Int. Cl.$^7$ .................................................. F16L 3/08
(52) U.S. Cl. ....................... 248/74.1; 24/16 R; 248/65; 248/74.3; 248/230.1
(58) Field of Search .................. 248/74.1, 74.3, 248/61, 62, 63, 65, 230.1, 230.9, 316.1, 313; 24/16 R, 19, 16 PB; 403/398, 400

(56) References Cited

U.S. PATENT DOCUMENTS

| | | | |
|---|---|---|---|
| 2,720,016 | * 10/1955 | Johannsen | 248/230.9 |
| 3,022,557 | 2/1962 | Logan | 24/17 |
| 3,510,918 | 5/1970 | Oetiker | 24/19 |
| 3,893,647 | 7/1975 | Kennedy | 248/68 R |
| 4,024,604 | * 5/1977 | Klimek et al. | 24/16 R |
| 4,148,113 | * 4/1979 | Dvorachek | 24/16 R |
| 4,407,472 | * 10/1983 | Beck | 248/89 |
| 4,562,982 | * 1/1986 | McSherry et al. | 248/61 |
| 4,733,835 | 3/1988 | Schlanger et al. | 248/71 |
| 4,997,157 | * 3/1991 | Sweeny | 248/313 |
| 5,131,278 | * 7/1992 | Baumoel | 73/861.18 |
| 5,215,281 | * 6/1993 | Sherman | 248/74.1 |
| 5,474,268 | 12/1995 | Yu | 248/61 |
| 5,566,916 | * 10/1996 | Bailey | 248/230.1 |
| 5,568,905 | * 10/1996 | Smith, II | 248/65 |
| 5,819,374 | 10/1998 | Chiles et al. | 24/16 PB |
| 5,839,703 | * 11/1998 | Tesar | 248/65 |
| 6,106,189 | * 8/2000 | Seale | 403/398 |

FOREIGN PATENT DOCUMENTS

| | | |
|---|---|---|
| 0 518 540 A2 | 12/1992 | (EP) . |
| 2 652 130 A1 | 3/1991 | (FR) . |

OTHER PUBLICATIONS

Shimano Bicycle System Cmponents: Three Catalog Pages; Apr. 1982.

* cited by examiner

Primary Examiner—Ramon O. Ramirez
Assistant Examiner—Tan Le
(74) Attorney, Agent, or Firm—Shinjyu Global IP Counselors, LLP

(57) ABSTRACT

A conduit guide is disclosed for attaching bicycle cables or conduits to the bicycle frame. Basically, the conduit guide includes a strap and a retainer. The strap and retainer are designed to secure a bicycle conduit to the bicycle frame without exerting any substantial radial compressive force on the conduits. The strap is preferably a plastic tie-type of band clamp. Of course, other types of band clamps can be utilized. The retainer includes a U-shaped conduit retaining portion and a foot portion. The foot portion includes a first foot section and a second foot section integrally formed at the ends of the leg sections of the conduits retaining portion. A strap receiving recess is formed between the foot portion and the conduit retaining portion to secure the retainer to the bicycle frame without exerting a compressive force on the conduit. In alternate embodiments, a bridge is formed between leg sections for added stability. In selected embodiments, the conduit retaining portion is sized to receive a single conduit, while in other embodiments, the conduit receiving portion is sized to receive a pair of conduits.

19 Claims, 6 Drawing Sheets

CONDUIT GUIDE FOR BICYCLES

BACKGROUND OF THE INVENTION

1. Field of the Invention

This invention generally relates to a conduit guide for supporting a conduit on a frame member of a bicycle. More specifically, the present invention relates conduit guide for supporting a conduit on a frame member in a manner that prevents crushing of the conduit.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle.

These constantly improvements in bicycle components have resulted in new bicycle components and/or frames that are not compatible with older components and/or frames. The frame of the bicycle has been extensively redesigned. In fact, each bicycle manufacturer may have several different frame designs. Accordingly, all bicycle components can not work on all bicycle frames. Moreover, the newer components often have special cabling requirements. This requires either the bicycle component manufacturers to produce different bicycle components for different frame designs or the frame manufacturers to produce new frames that work with the newer components. For example, most bicycle frames have conduit guides (cable housing stoppers) that are welded on the frame tubes at various locations for guiding brake cables and shift cables from an operating device to a component of the bicycle, e.g., a brake or a derailleur. Depending upon the placement of these conduit guides, a particular brake or derailleur may not be able to be used with that particular frame.

In other words, one problem with welded conduit guides is that they require the cable to be directed along a particular path of the frame tubes. However, depending upon the bicycle component, the particular cable path provided by the welded conduit guides may not necessarily be suitable for certain configurations of bicycle components. Moreover, such welded conduit guides typically cannot be utilized with other types of conduits that transport a fluid. Also, welded conduit guides increase the overall cost of manufacturing the bicycle frame.

Instead of using fixed conduit guides, it is also known to use various types of straps or plastic ties to retain conduits, such as cables or tubes, onto the bicycle frame. However, these prior art clamps suffer from various problems. For example, if a regular plastic tie is utilized, the cable or tube is squeezed against the frame tube. In the case of a wire cable, the outer casing housing of the cable is squeezed against the inner wire. In the case of a pneumatic or hydraulic tube, a plastic tie will restrict the flow of fluid through the tube. Accordingly, bicycle clamps have been manufactured such as the one disclosed by U.S. Pat. No. 3,893,647 that do not exert substantial radial compressive forces on the conduit. However, these types of cable clamps typically do not provide sufficient clamping force to prevent longitudinal movement of the clamp along the frame member.

Another type of cable guide is disclosed in U.S. Pat. No. 4,733,835, which also does not exert an excessive radial compressive force on the cable. However, with this type of cable guide, a special frame is required. Moreover, the cable guide is fixed at a particular location and cannot be placed at any desired location along the frame tube. Thus, this type of cable guide may limit the types of components that can be used with a particular frame.

In view of the above, there exists a need for a conduit guide for supporting a conduit on a frame member of a bicycle which overcomes the above mentioned problems in the prior art. This invention addresses this need in the prior art as well as other needs, which will become apparent to those skilled in the art from this disclosure.

SUMMARY OF THE INVENTION

One object of the present invention is to provide a conduit guide for supporting a conduit on a frame member of a bicycle member in a manner that prevents crushing of the conduit.

Another object of the present invention is to provide a conduit guide that is relatively easy and inexpensive to manufacture.

Another object of the present invention is to provide a conduit guide that is relatively easy to install.

Yet another object of the present invention is to provide a conduit guide that can be install on a wide variety of bicycle frames.

Still another object of the present invention is to provide a conduit guide that can be install on at wide variety of locations on the bicycle frame.

The foregoing objects can basically be attained by providing a retainer for coupling a conduit to a frame member via a strap. The retainer has a foot portion, a conduit retaining portion and a strap receiving opening. The foot portion has a frame contacting surface for engaging a tubular frame member. The conduit retaining portion extends from the foot portion, and is shaped to form a conduit receiving or retaining opening. The strap receiving opening is formed between the foot portion and the conduit receiving or retaining opening of the conduit retaining portion.

The foregoing objects can basically be attained by providing a conduit guide for coupling a conduit to a frame member. The conduit guide includes a strap and a retainer. The strap includes a first end portion, an intermediate portion and a second end portion with complementary tightening structures coupled to the first and second end portions to fasten the first and second end portions together. The retainer is adjustably coupled to the intermediate portion of the strap. The retainer has a foot portion, a conduit retaining portion and a strap receiving opening. The foot portion has a frame contacting surface for engaging a tubular frame member. The conduit retaining portion extends from the foot portion, and is shaped to form a conduit receiving opening. The strap receiving opening is formed between the foot portion and the conduit receiving opening of the conduit retaining portion.

In selected embodiments of the present invention, the retainer is designed to accommodate a single conduit. Other embodiments are designed to accommodate a pair of conduits. The term "conduit" as used herein includes, but is not limited to, a tube with an internal passageway and a cable with an outer housing and an inner wire.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
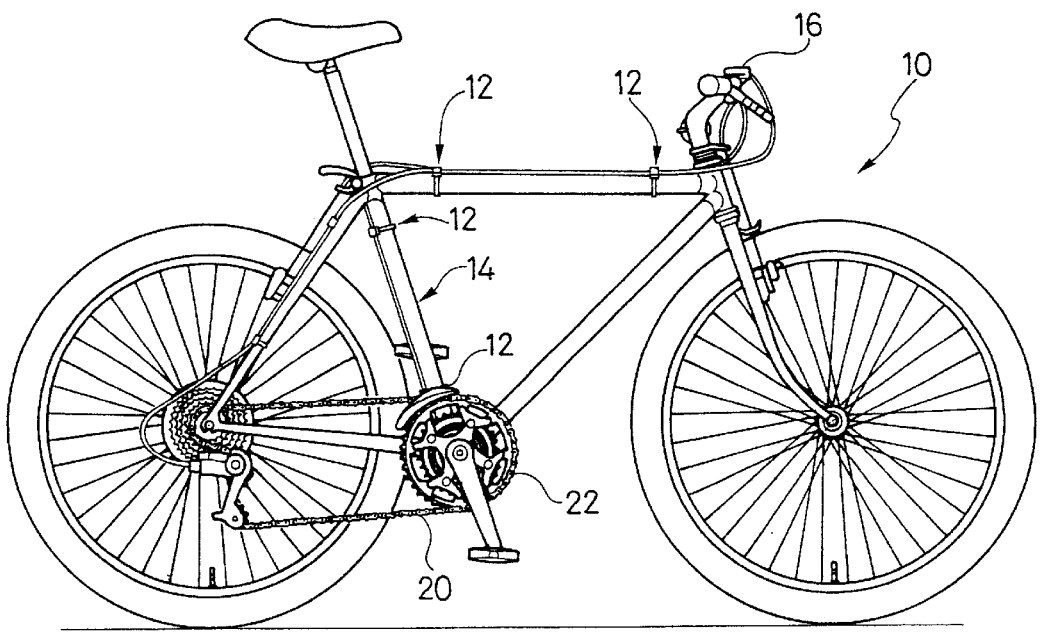
FIG. 1 is a side elevational view of a conventional bicycle with conduit guides coupled thereto in accordance with the present invention.

Referring initially to FIG. 1, a bicycle 10 is illustrated with conduit guides 12 coupled thereto in accordance with the present invention. Bicycle 10 is preferably a conventional bicycle with a bicycle frame 14. Bicycle 10 and its various components are well known in the art, and thus, bicycle 10 and its various components will not be discussed or illustrated in detail herein except for as needed to explain the present invention.

Figure 2:
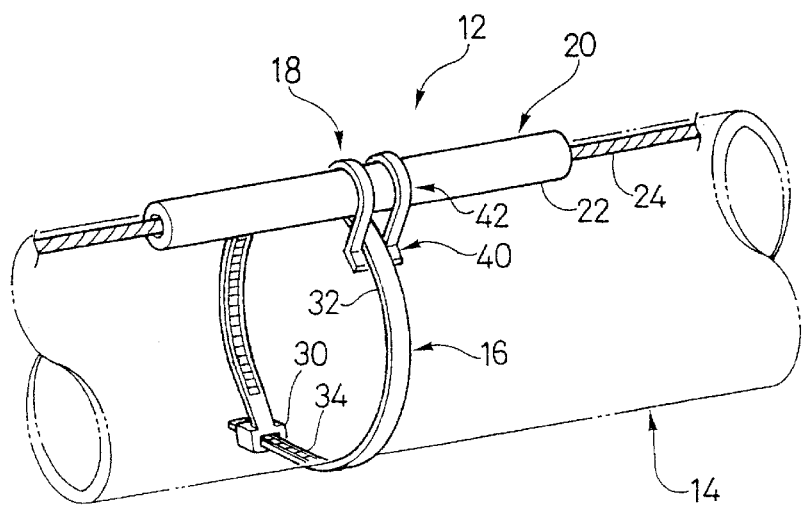
FIG. 2 is an enlarged, partial perspective view of a conduit guide coupling a conduit to a frame tube in accordance with one embodiment of the present invention.
Figure 3:
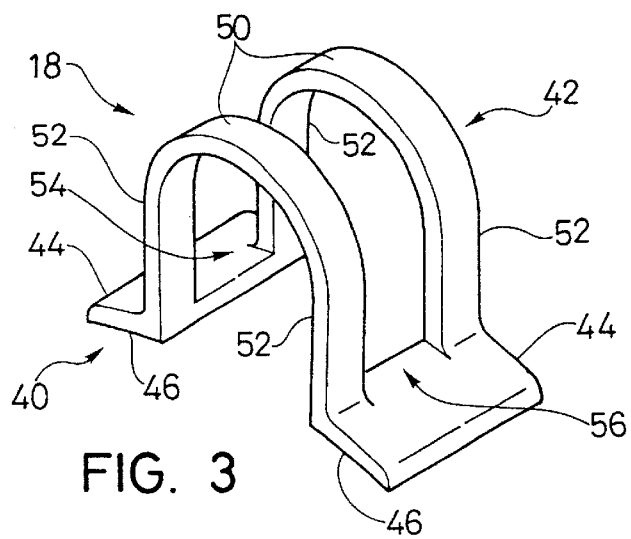
FIG. 3 is an enlarged perspective view of the retainer for the conduit guide illustrated in FIG. 2 in accordance with the first embodiment of the present invention.
Figure 4:
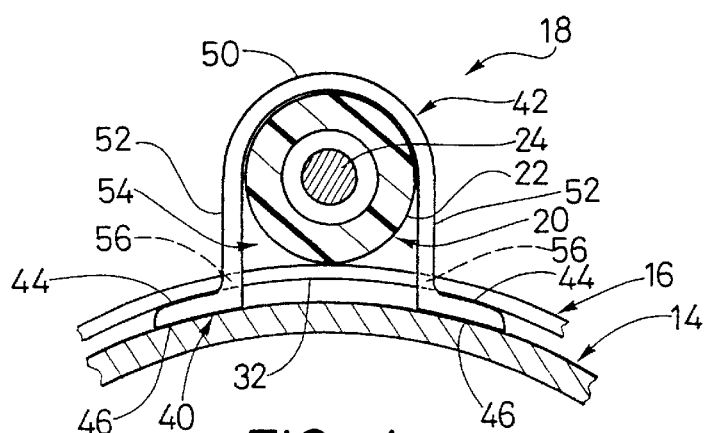
FIG. 4 is an end elevational view of the retainer illustrated in FIGS. 2 and 3 with the strap coupling the retainer to a bicycle frame tube in accordance with the first embodiment of the present invention.

Referring now to FIGS. 2–4, conduit guide 12 basically includes a strap 16 and a retainer 18 coupled to bicycle frame 14 by strap 16. In this embodiment, conduit guide 12 supports a single conduit or cable 20 that has an outer cable housing 22 and an inner wire 24. Strap 16 holds the retainer 18 against the tubular portion of frame 14 without exerting any substantial radial compressive force on cable 20. In other words, substantially no radially compressive force is applied on outer cable housing 22 that would restrict the longitudinal movement of inner wire 24 within outer cable housing 22.

In this embodiment, strap 16 is an adjustable strap that can be utilized with a range of diameters of frame tubings. More specifically, strap 16 is preferably a plastic tie-type of strap that is adjustable. Plastic tie-type straps as illustrated in the drawings are well known in the art. Therefore, strap 16 will not be discussed or illustrated in detail herein. Basically, strap 16 has a first end portion 30, an intermediate portion 32 and a second end portion 34. First end portion 30 and second end portion 34 have complimentary tightening structures that are well known in the art. More specifically, first end portion 30 is provided with a slot that has a resilient protrusion located therein, while second end portion 34 has a plurality of transverse ribs or teeth that selectively engage the protrusion of the first end portion 30. Strap 16 is preferably constructed as a one-piece, unitary member that is molded from a resilient plastic material. Any conventional plastic material known to those skilled in the art may be used.

As best seen in FIGS. 2–4, retainer 18 basically includes a foot portion 40 and a conduit retaining portion 42. Retainer 18 can located anywhere along the length of intermediate portion 32 of strap 16. Foot portion 40 engages the curved surface of frame 14, while conduit retaining portion 42 holds cable 20 at a particular location on the tubular portion of frame 14. Preferably, retainer 18 is constructed as a one-piece, unitary member. Preferably, retainer 18 is also constructed of a lightweight material such as plastic. Of course, it will be apparent to those skilled in the art from this disclosure that other types of materials can be utilized to carry out the present invention.

Foot portion 40 is preferably formed by first and second foot sections 44 that are spaced apart from each other by approximately the diameter of the outer cable housing 22. Foot sections 44 each have a curved contact surface 46 that is adapted to engage the outer surface of the tube of frame 14.

Conduit retaining portion 42 is preferably U-shaped. In the preferred embodiments, conduit retaining portion 42 is formed by a pair of U-shaped members that are axially spaced apart from each other relative to cable 20. Each of the U-shaped members has a bight section 50 with a pair of parallel leg sections 52 extending therefrom. Leg sections 52 are integrally formed with foot sections 44. The curved inner surfaces formed by conduit retaining portion 42 define a conduit retaining opening 54 for receiving cable 20 therein. Preferably, conduit retaining opening 54 is sized to receive cable 20 therein without exerting any substantial radial compressive force thereon.

A strap receiving opening 56 is formed by the space between the U-shaped members of the conduit retaining portion 42. Preferably, the width of the strap receiving opening 56 is slightly larger than the width of strap 16 for receiving the intermediate portion 32 of strap 16 therein. When strap 16 is received in strap receiving opening 56, the strap 16 engages the top or outer surfaces of foot sections 44. Accordingly, cable 20 is located between strap 16 and conduit retaining portion 42 so that the clamping force of strap 16 does not exert any substantial pressure on the cable 20.

Conduit guide 12 is installed on the tubular member of frame 14, by first inserting strap 16 into the strap receiving opening 56 of retainer 18. Now, the strap 16 can be installed onto the tubular member of frame 14. The end portions 30 and 34 of strap 16 are connected together by their complimentary tightening structure so as to provide a tight clamping force around the frame tube of frame 14. Because the strap 16 is adjustable, conduit guide 12 can be mounted on a variety of sizes and shapes of tubes or frame members. Moreover, a strong clamping force can be applied to the tube or frame member of frame 14 without applying a compressive force to the cable 20. The cable 20 can then be inserted through the conduit retaining opening 54. Alternatively, cable 20 can be inserted into conduit retaining opening 54 prior to strap 16 being installed around the frame tube or member of frame 14.

Figure 5:
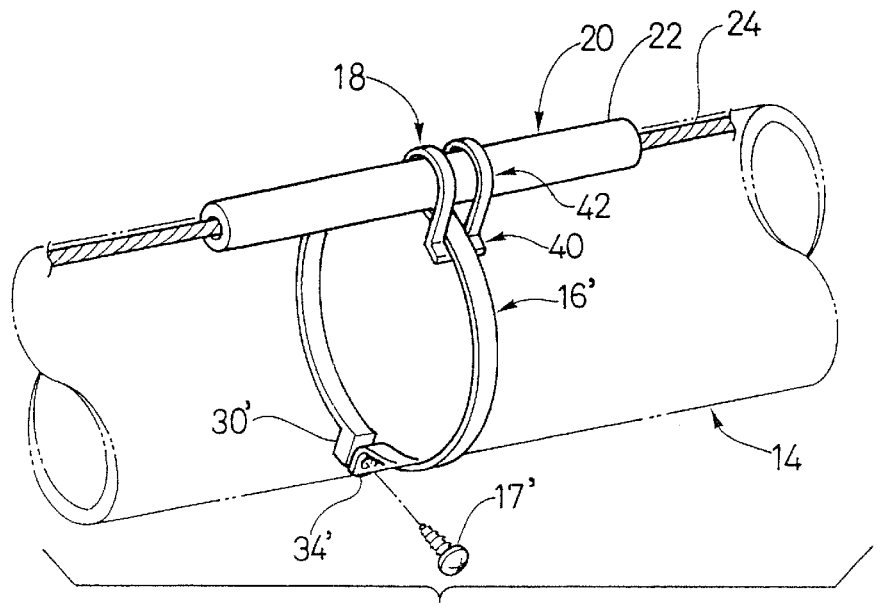
FIG. 5 is a partial perspective view of the retainer for the conduit guide illustrated in FIGS. 2–4, but with an alternate type of strap.
Figure 6:
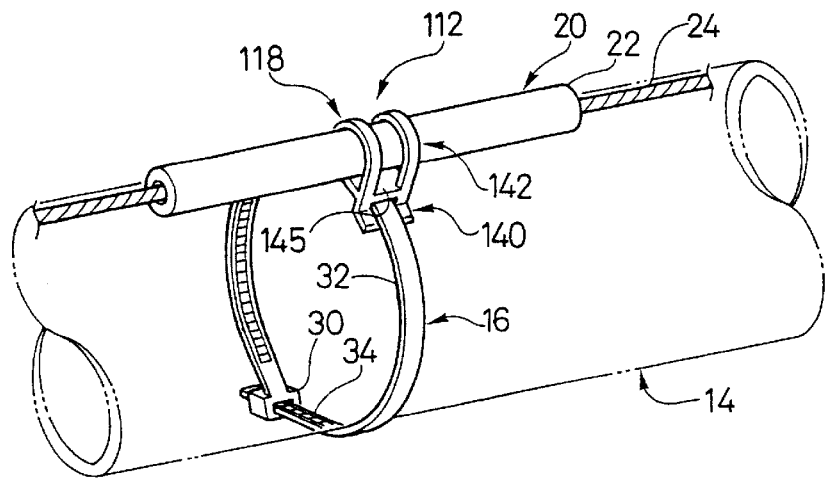
FIG. 6 is an enlarged, partial perspective view of a conduit guide coupling a conduit to a frame tube in accordance with a second embodiment of the present invention.
Figure 7:
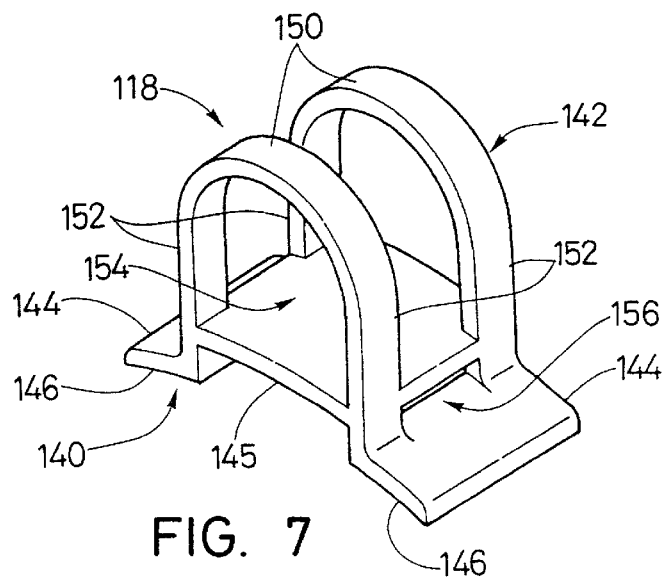
FIG. 7 is an enlarged perspective view of the retainer for the conduit guide illustrated in FIG. 6 in accordance with the second embodiment of the present invention.
Figure 8:
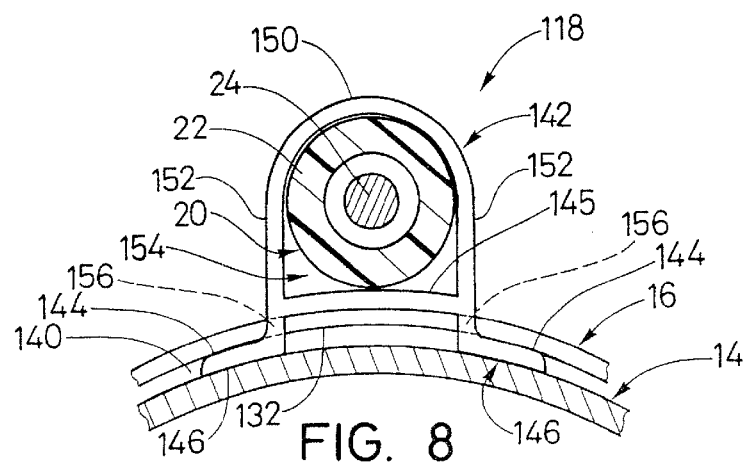
FIG. 8 is an end elevational view of the retainer illustrated in FIGS. 6 and 7 with the strap coupling the retainer to a bicycle frame tube in accordance with the second embodiment of the present invention.

As seen in FIG. 5, strap 16 has been replaced with strap 16'. Strap 16' is substantially identical to strap 16, except that the tightening structure for connecting first and second end portions 30' and 34' together has been modified. Specifically, strap 16' is a plastic strap having first and second end portions 30' and 34' coupled together by a self-tapping screw 17'. Strap 16' is designed to be used with a specific size of a frame member or tube of frame 14.

SECOND EMBODIMENT

Referring now to FIGS. 6–9, a conduit guide 112 in accordance with a second embodiment of the present invention is illustrated. The conduit guide 112 of this embodiment is substantially identical to the conduit guide 12, discussed above, except that retainer 118 of conduit guide 112 has been modified as discussed below. In view of the similarities between this embodiment and the prior embodiment, identical reference numbers will be utilized to refer to the specific parts of this embodiment that corresponds the same parts of the first embodiment. Moreover, it will be apparent to those skilled in the art from this disclosure that various parts and descriptions of the prior embodiment also apply to the similar or identical parts of this embodiment. Accordingly, conduit guide 112 of this embodiment will not be discussed or illustrated in as much detail.

Referring now to FIGS. 6–9, conduit guide 112 basically includes a strap 16 (same as in the first embodiment) and a retainer 118 that is coupled to bicycle frame 14 by strap 16. In this embodiment, conduit guide 112 supports a single conduit or cable 20. Strap 16 holds the retainer 118 against the tubular portion of frame 14 without exerting any substantial radial compressive force on cable 20. In other words, substantially no radially compressive force is applied on outer cable housing 22 that would restrict the longitudinal movement of inner wire 24 within outer cable housing 22.

Retainer 118 basically includes a foot portion 140 and a conduit retaining portion 142. Foot portion 140 engages the curved surface of frame 14, while conduit retaining portion 142 holds cable 20 at a particular location on the tubular portion of frame 14. Preferably, retainer 118 is constructed as a one-piece, unitary member. Preferably, retainer 118 is also constructed of a lightweight material such as plastic. Of course, it will be apparent to those skilled in the art from this disclosure that other types of materials can be utilized to carry out the present invention.

Foot portion 140 is preferably formed by first and second foot sections 144 that are spaced apart from each other by approximately the diameter of the outer cable housing 22. Foot sections 144 each have a curved contact surface 146 that is adapted to engage the outer surface of the tube of frame 14.

In this embodiment, conduit retaining portion 142 is preferably U-shaped with a bridge 145 connecting the open end of the U. Conduit retaining portion 142 is formed by a pair of U-shaped members that are spaced apart from each other. Each of the U-shaped members has a bight section 150 with a pair of parallel leg sections 152 extending therefrom. Bridge 145 connects leg sections 152 together for added strength. Leg sections 152 are integrally formed with foot sections 144 and bridge 145. The curved inner surfaces formed by conduit retaining portion 142 define a conduit retaining opening 154 for receiving cable 20 therein. Preferably, conduit retaining opening 154 is sized to receive cable 20 therein without exerting any substantial radial compressive force thereon.

A strap receiving opening 156 is formed by the bridge 145, the foot sections 144, and the U-shaped members of the conduit retaining portion 142. Preferably, the width of the strap receiving opening 156 is slightly larger than the width of strap 16 for receiving the intermediate portion 32 of strap 16 therein. When strap 16 is received in strap receiving opening 156, the strap 16 is located between bridge 145 and foot sections 144, and engages the top or outer surfaces of foot sections 144. In other words, strap 16 applies a radially directed force on each of the foot sections 144 to hold retainer 118 against frame 14. Accordingly, cable 20 is located above strap 16 and bridge 145 so that the clamping force of strap 16 does not exert any substantial pressure on the cable 20.

Conduit guide 112 is installed on the tubular member of frame 14, by first inserting strap 16 into the strap receiving opening 156 of retainer 118. Now, the strap 16 can be installed onto the tubular member of frame 14. The end portions 30 and 34 of strap 16 are connected together by their complimentary tightening structure so as to provide a tight clamping force around the frame tube of frame 14. Because the strap 16 is adjustable, conduit guide 112 can be mounted on a variety of sizes and shapes of tubes or frame members. Moreover, a strong clamping force can be applied to the tube or frame member of frame 14 without applying a compressive force to the cable 20. The cable 20 can then be inserted through the conduit retaining opening 154. Alternatively, cable 20 can be inserted into conduit retaining opening 154 prior to strap 16 being installed around the frame tube or member of frame 14.

Figure 9:
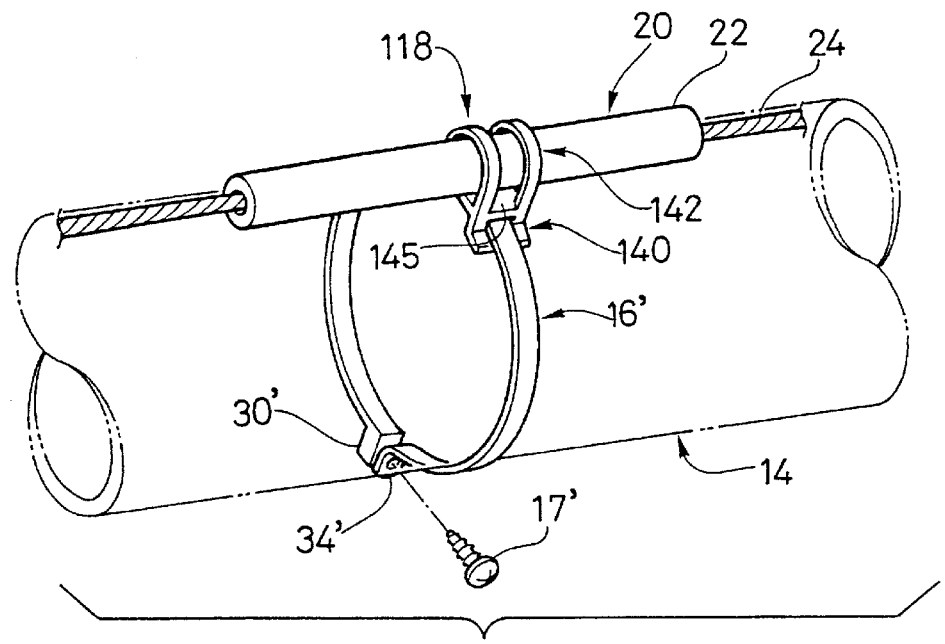
FIG. 9 is a partial perspective view of the retainer for the conduit guide illustrated in FIGS. 6–8, but with an alternate type of strap.
Figure 10:
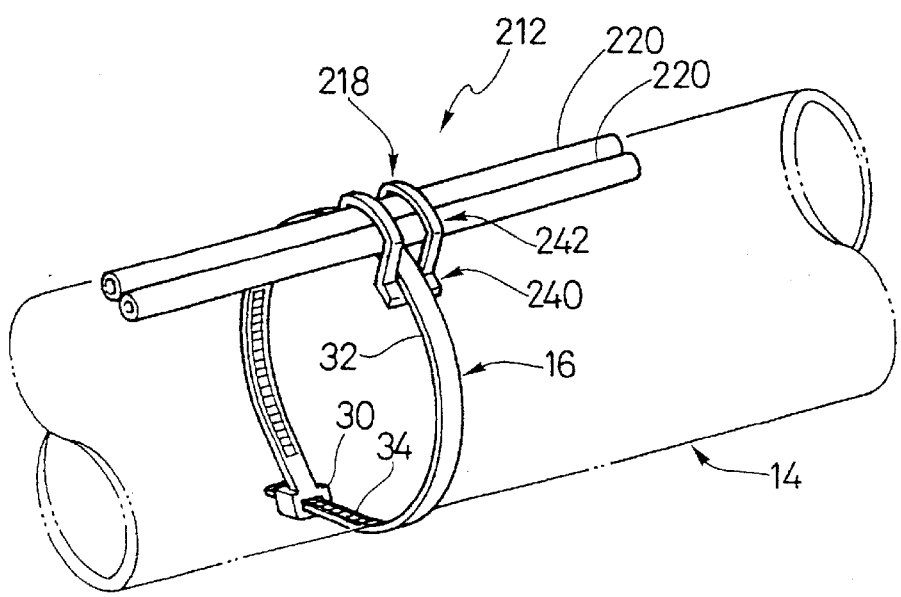
FIG. 10 is an enlarged, partial perspective view of a conduit guide coupling a pair of conduits to a frame tube in accordance with a third embodiment of the present invention.

As seen in FIG. 9, retainer 118 can also be used with strap 16' in the same manner as the first embodiment. Strap 16' is designed to be used with a specific size of a frame member or tube of frame 14.

THIRD EMBODIMENT

Referring now to FIGS. 10–13, a conduit guide 212 in accordance with a third embodiment of the present invention is illustrated. The conduit guide 212 is similar to conduit guide 12, as discussed above, except that the bight sections 250 have been modified to accommodate a pair of conduits 220 therein. More specifically, in this embodiment, two air tubes 220 are illustrated as being retained conduit guide 212 against frame 14. Of course, tubes 220 could be replaced with a pair of cables 20.

Figure 11:
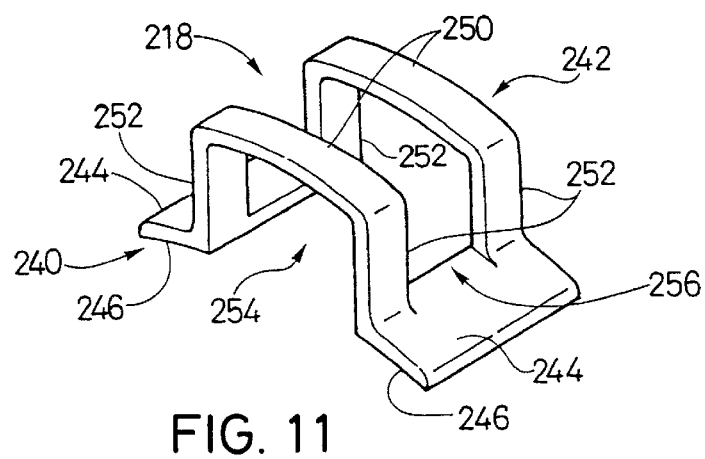
FIG. 11 is an enlarged perspective of the retainer illustrated in FIG. 10 in accordance with the third embodiment the present invention.
Figure 12:
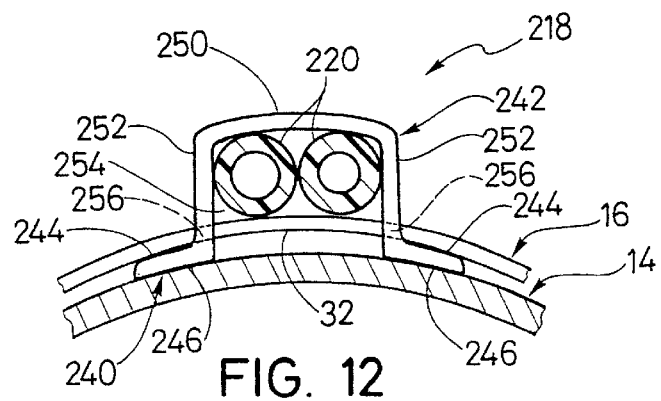
FIG. 12 is an end elevational view of the retainer illustrated in FIGS. 10 and 11 with the strap coupling the retainer with a pair of air tubes or conduits located therein to a bicycle frame.

Referring now to FIGS. 11 and 12, conduit guide 212 basically includes a strap 16 and a retainer 218 that is coupled to bicycle frame 14 by strap 16. Strap 16 holds the retainer 218 against the tubular portion of frame 14 without exerting any substantial radial compressive force on air tubes 220. In other words, substantially no radially compressive force is applied on air tubes 220 that would restrict the flow of air or fluid therethrough.

Retainer 218 basically includes a foot portion 240 and a conduit retaining portion 242. Foot portion 240 engages the curved surface of frame 14, while conduit retaining portion 242 holds air tubes 220 at a particular location on the tubular portion of frame 14. Preferably, retainer 218 is constructed as a one-piece, unitary member. Preferably, retainer 218 is also constructed of a lightweight material such as plastic. Of course, it will be apparent to those skilled in the art from this disclosure that other types of materials can be utilized to carry out the present invention.

Foot portion 240 is preferably formed by first and second foot sections 244 that are spaced apart from each other by approximately twice the diameter of the one the air tubes 220. Foot sections 244 each have a curved contact surface 246 that is adapted to engage the outer surface of the tube of frame 14.

Conduit retaining portion 242 is preferably U-shaped. In the preferred embodiments, conduit retaining portion 242 is formed by a pair of U-shaped members that are spaced apart from each other. Each of the U-shaped members has a bight section 250 with a pair of parallel leg sections 252 extending therefrom. Leg sections 252 are integrally formed with foot sections 244. The curved inner surfaces formed by conduit retaining portion 242 define a conduit retaining opening 254 for receiving air tubes 220 therein. Preferably, conduit retaining opening 254 is sized to receive air tubes 220 therein without exerting any substantial radial compressive force thereon.

A strap receiving opening 256 is formed by the space between the U-shaped members of the conduit retaining portion 242. Preferably, the width of the strap receiving opening 256 is slightly larger than the width of strap 16 for receiving the intermediate portion 32 of strap 16 therein. When strap 16 is received in strap receiving opening 256, the strap 16 engages the top or outer surfaces of foot sections 244. Accordingly, air tubes 220 are located between strap 16 and conduit retaining portion 242 so that the clamping force of strap 16 does not exert any substantial pressure on the air tubes 220.

Conduit guide 212 is installed on the tubular member of frame 14, by first inserting strap 16 into the strap receiving opening 256 of retainer 218. Now, the strap 16 can be installed onto the tubular member of frame 14. The end portions 30 and 34 of strap 16 are connected together by their complimentary tightening structure so as to provide a tight clamping force around the frame tube of frame 14. Because the strap 16 is adjustable, foot conduit guide 212 can be mounted on a variety of sizes and shapes of tubes or frame members. Moreover, a strong clamping force can be applied to the tube or frame member of frame 14 without applying a compressive force to the air tubes 220. The air tubes 220 can then be inserted through the conduit retaining opening 254. Alternatively, air tubes 220 can be inserted into conduit retaining opening 254 prior to strap 16 being installed around the frame tube or member of frame 14.

Figure 13:
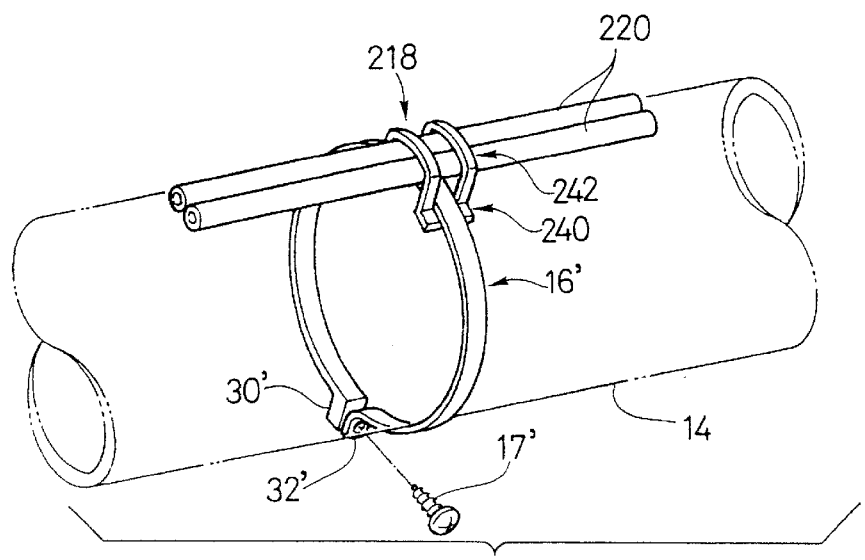
FIG. 13 is a perspective view of the conduit guide with the retainer illustrated in FIGS. 10–12, but with an alternate type of strap.

As seen in FIG. 13, retainer 218 can also be used with strap 16' in the same manner as the prior embodiment. Strap 16' is designed to be used with a specific size of a frame member or tube of frame 14.

FOURTH EMBODIMENT

Referring now to FIGS. 14–17, a conduit guide 312 in accordance with a fourth embodiment of the present invention is illustrated. Conduit guide 312 is a hybrid version of the second and third embodiments. More specifically, conduit guide 312 includes a retainer 318 which is designed to be utilized with a pair of conduits 320, e.g. cables, wires, pneumatic tubes, hydraulic tubes, etc.

Figure 14:
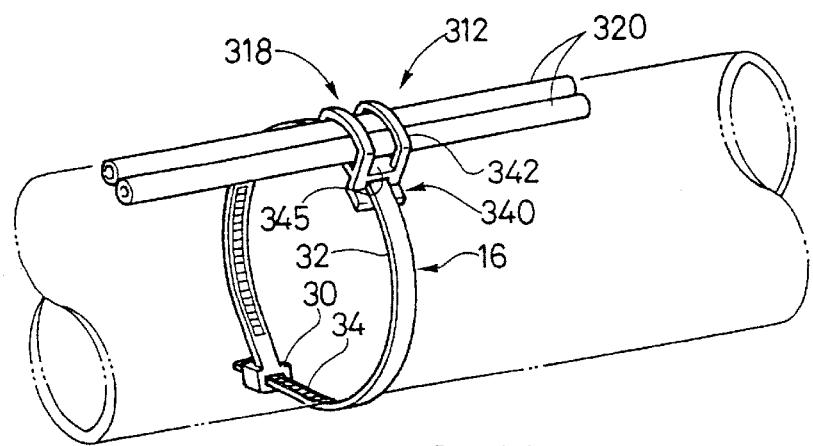
FIG. 14 is an enlarged, partial perspective view of a conduit guide with a strap coupling a retainer to a bicycle frame tube in accordance with a fourth embodiment of the present invention.
Figure 15:
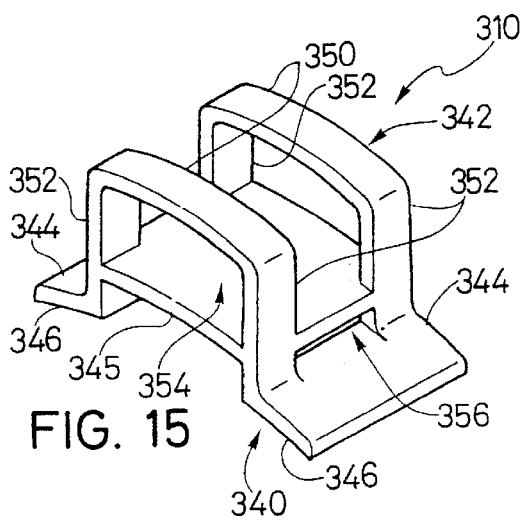
FIG. 15 is an enlarged perspective view of the retainer illustrated in FIG. 14 in accordance with the fourth embodiment of the present invention.
Figure 16:
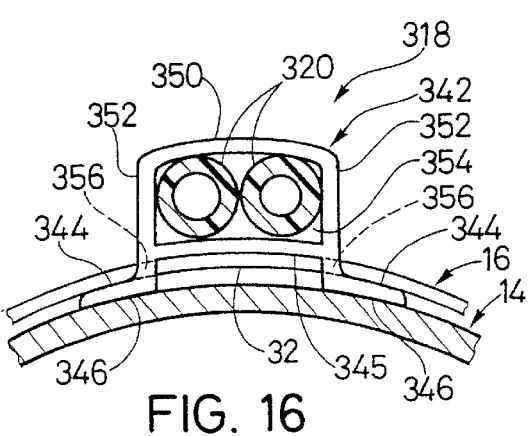
FIG. 16 is an end elevational view of the retainer illustrated in FIGS. 14 and 15 with the strap coupling the retainer with a pair of air tubes or conduits located therein to a bicycle frame.

Referring now to FIG. 14, conduit guide 312 basically includes a strap 16 and a retainer 318 that is coupled to bicycle frame 14 by strap 16. In this embodiment, conduit guide 312 supports a pair of conduits (e.g., cables or tube or the like) 320. Strap 16 holds the retainer 318 against the tubular portion of frame 14 without exerting any substantial radial compressive force on conduits 320. In other words, substantially no radially compressive force is applied on conduits 320 that would restrict the flow of air or fluid therethrough.

Retainer 318 basically includes a foot portion 340 and a conduit retaining portion 342. Foot portion 340 engages the curved surface of frame 14, while conduit retaining portion 342 holds conduits 320 at a particular location on the tubular portion of frame 14. Preferably, retainer 318 is constructed as a one-piece, unitary member. Preferably, retainer 318 is also constructed of a lightweight material such as plastic. Of course, it will be apparent to those skilled in the art from this disclosure that other types of materials can be utilized to carry out the present invention.

Foot portion 340 is preferably formed by first and second foot sections 344 that are spaced apart from each other by approximately twice the diameter of one of the conduits 320. Foot sections 344 each have a curved contact surface 346 that is adapted to engage the outer surface of the tube of frame 14.

Conduit retaining portion 342 is preferably U-shaped. In the preferred embodiments, conduit retaining portion 342 is formed by a pair of U-shaped members that are spaced apart from each other. Each of the U-shaped members has a bight section 350 with a pair of parallel leg sections 352 extending therefrom. A bridge 345 connects leg sections 352 together for added strength. Leg sections 352 are integrally formed with foot sections 344 and bridge 345. The curved inner surfaces formed by conduit retaining portion 342 define a conduit retaining opening 354 for receiving conduits 320 therein. Preferably, conduit retaining opening 354 is sized to receive conduits 320 therein without exerting any substantial radial compressive force thereon.

A strap receiving opening 356 is formed by the bridge 345, the foot sections 344, and the U-shaped members of the conduit retaining portion 342. Preferably, the width of the strap receiving opening 356.is slightly larger than the width of strap 16 for receiving the intermediate portion 32 of strap 16 therein. When strap 16 is received in strap receiving opening 356, the strap 16 is located between bridge 345 and foot sections 344, and engages the top or outer surfaces of foot sections 344. In other words, strap 16 applies a radially directed force on each of the foot sections 344 to hold retainer 318 against frame 14. Accordingly, conduits 320 are located between strap 16 and cable retaining portion 342 so that the clamping force of strap 16 does not exert any substantial pressure on the conduits 320.

Conduit guide 312 is installed on the tubular member of frame 14, by first inserting strap 16 into the strap receiving opening 356 of retainer 318. Now, the strap 16 can be installed onto the tubular member of frame 14. The end portions 30 and 34 of strap 16 are connected together by their complimentary tightening structure so as to provide a tight clamping force around the frame tube of frame 14. Because the strap 16 is adjustable, conduit guide 312 can be mounted on a variety of sizes and shapes of tubes or frame members. Moreover, a strong clamping force can be applied to the tube or frame member of frame 14 without applying a compressive force to the conduits 320. The conduits 320 can then be inserted through the conduit retaining opening 354. Alternatively, conduits 320 can be inserted into conduit retaining opening 354 prior to strap 16 being installed around the frame tube or member of frame 14.

Figure 17:
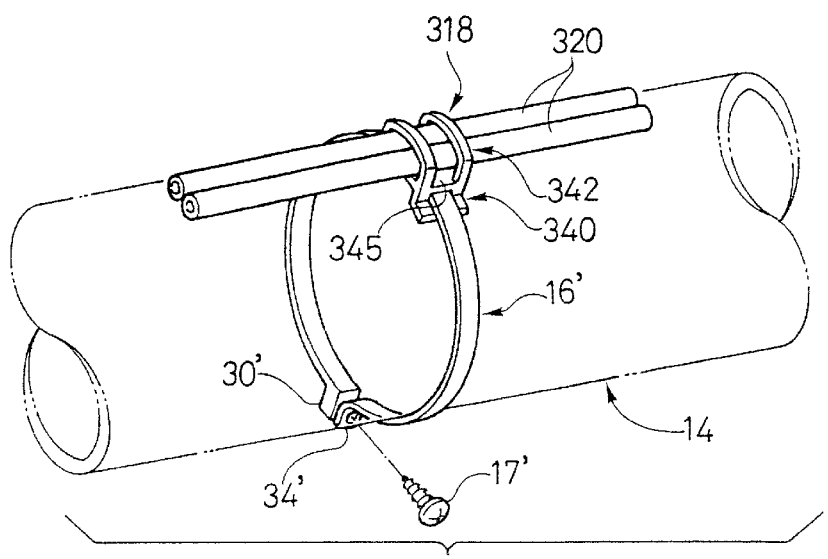
FIG. 17 is a perspective view of a conduit guide with the retainer illustrated in FIGS. 14–16 but with an alternate strap.

As seen in FIG. 17, retainer 318 can also be used with strap 16' in the same manner as the prior embodiment. Strap 16' is designed to be used with a specific size of a frame member or tube of frame 14.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A retainer for coupling a conduit to a frame member via a strap, comprising:

a foot portion having a first side with a pair of separate foot sections spaced from each other to form a space therebetween, each of said foot sections having a frame contacting surface on said first side of said foot portion;

a conduit retaining portion extending from a second side of said foot portion that is opposite from said first side of said foot portion, said conduit retaining portion being formed by two U-shaped members axially spaced from each other with each of said U-shaped members having a pair of leg sections extending from a bight section, said conduit retaining portion being shaped to form a conduit receiving opening on said second side of said foot portion between said foot sections; and a strap receiving opening formed between said foot portion and said conduit receiving opening of said conduit retaining portion.

2. A retainer according to claim 1, wherein said foot sections are formed at said leg sections of said conduit retaining portion.

3. A retainer according to claim 1, wherein said conduit receiving opening of said conduit retaining portion is sized to receive a pair of conduits.

4. A retainer according to claim 1, wherein said conduit receiving opening of said conduit retaining portion is sized to receive a single conduit.

5. A retainer according to claim 1, wherein said frame contacting surfaces of said foot sections are curved surfaces that are spaced apart from each other.

6. A retainer according to claim 1, wherein said foot portion includes a bridge section connecting said leg sections of said conduit retaining portion together on said second side of said foot sections.

7. A retainer according to claim 6 wherein said strap receiving opening is formed between said bridge section and said foot sections.

8. A retainer for coupling a conduit to a frame member via a strap, comprising:

a foot portion with a flame contacting surface;

a conduit retaining portion extending from said foot portion, said conduit retaining portion being formed by two U-shaped members axially spaced from each other with each of said U-shaped members having a pair of leg sections extending from a bight section, said conduit retaining portion being shaped to form a conduit receiving opening; and a strap receiving opening formed between said foot portion and said conduit receiving opening of said conduit retaining portion, said foot portion being formed at said leg sections of said conduit retaining portion and including a bridge section connecting said leg sections of said conduit retaining portion together.

9. A retainer according to claim 8 wherein said strap receiving opening is formed between said bridge section and said foot portion.

10. A conduit guide for coupling a conduit to a frame member, comprising:

a strap including a first end portion, an intermediate portion and a second end portion with complementary tightening structures coupled to said first and second end portions to fasten said first and second end portions together; and a retainer coupled to said intermediate portion of said strap, said retainer including a foot portion with a frame contacting surface and a conduit retaining portion extending from said foot portion and shaped to form a conduit receiving opening, and a strap receiving opening formed between said foot portion and said conduit receiving opening of said conduit retaining portion.

11. A conduit guide according to claim 10, wherein said conduit retaining portion is U-shaped with a pair of leg sections extending from a bight section.

12. A conduit guide according to claim 11, wherein said foot portion is formed at said leg sections of said conduit retaining portion.

13. A conduit guide according to claim 12, wherein said foot portion includes a bridge section connecting said leg sections of said conduit retaining portion together.

14. A conduit guide according to claim 13 wherein said strap receiving opening is formed between said bridge section and said foot portion.

15. A conduit guide according to claim 10, wherein said conduit receiving opening of said conduit retaining portion is sized to receive a pair of conduits.

16. A conduit guide according to claim 10, wherein said conduit receiving opening of said conduit retaining portion is sized to receive a single conduit.

17. A conduit guide according to claim 10, wherein said frame contacting surface of said foot portion is curved.

18. A conduit guide according to claim 10, wherein said frame contacting surface of said foot portion is formed by a pair of curved surfaces that are spaced apart from each other.

19. A conduit guide according to claim 10, wherein said conduit retaining portion is formed by two U-shaped members with each of said U-shaped members having a pair of leg sections extending from a bight section.

\* \* \* \* \*